United States Patent [19]

Tsunekawa

[11] Patent Number: 4,992,883
[45] Date of Patent: Feb. 12, 1991

[54] IMAGE SENSING ARRANGEMENT

[75] Inventor: Tokuichi Tsunekawa, Yokohama, Japan

[73] Assignee: Canon Kabushiki Kaisha, Tokyo, Japan

[21] Appl. No.: 455,778

[22] Filed: Jan. 2, 1990

Related U.S. Application Data

[63] Continuation of Ser. No. 33,885, Apr. 2, 1987, abandoned, which is a continuation of Ser. No. 885,816, Jul. 21, 1986, abandoned, which is a continuation of Ser. No. 462,187, Jan. 31, 1983, abandoned.

[30] Foreign Application Priority Data

Feb. 10, 1982 [JP] Japan ............................ 57-20994
Feb. 10, 1982 [JP] Japan ............................ 57-20995
Feb. 10, 1982 [JP] Japan ............................ 57-20996
Feb. 10, 1982 [JP] Japan ............................ 57-20997

[51] Int. Cl.⁵ .................................... H04N 5/76
[52] U.S. Cl. ............................ 358/335; 358/906; 358/909; 358/213.13
[58] Field of Search ........... 358/335, 906, 909, 213.13; 360/33.1, 35.1; 354/410, 442, 242, 465

[56] References Cited

U.S. PATENT DOCUMENTS

| | | | |
|---|---|---|---|
| 4,057,830 | 11/1977 | Adcock | 360/35.1 |
| 4,096,503 | 6/1978 | Sato | 354/242 |
| 4,131,919 | 12/1978 | Lloyd | 358/906 |
| 4,366,501 | 12/1982 | Tsunekawa | 358/906 |
| 4,447,837 | 5/1984 | Hirata | 358/906 |
| 4,456,931 | 6/1984 | Toyoda | 358/335 |
| 4,541,021 | 9/1985 | Konishi | 358/335 |
| 4,546,390 | 10/1985 | Konishi | 360/33.1 |
| 4,599,657 | 7/1986 | Kaji et al. | |

FOREIGN PATENT DOCUMENTS

| | | | |
|---|---|---|---|
| 2916334 | 10/1979 | Fed. Rep. of Germany | 338/906 |
| 3105536 | 12/1981 | Fed. Rep. of Germany | 338/906 |
| 140507 | 10/1979 | Japan | 358/906 |
| 165077 | 12/1980 | Japan | 358/906 |

Primary Examiner—Robert L. Richardson
Attorney, Agent, or Firm—Fitzpatrick, Cella, Harper & Scinto

[57] ABSTRACT

A video camera or the like has a solid-state image sensing device such as a CCD provides optical exposure both in the single photography mode and the continuous photography mode. Even after a picture is taken, power supply to a recording device is held until the image signals are completely recorded by the recording device. Power supply to the recording device before taking a picture is not required.

44 Claims, 7 Drawing Sheets

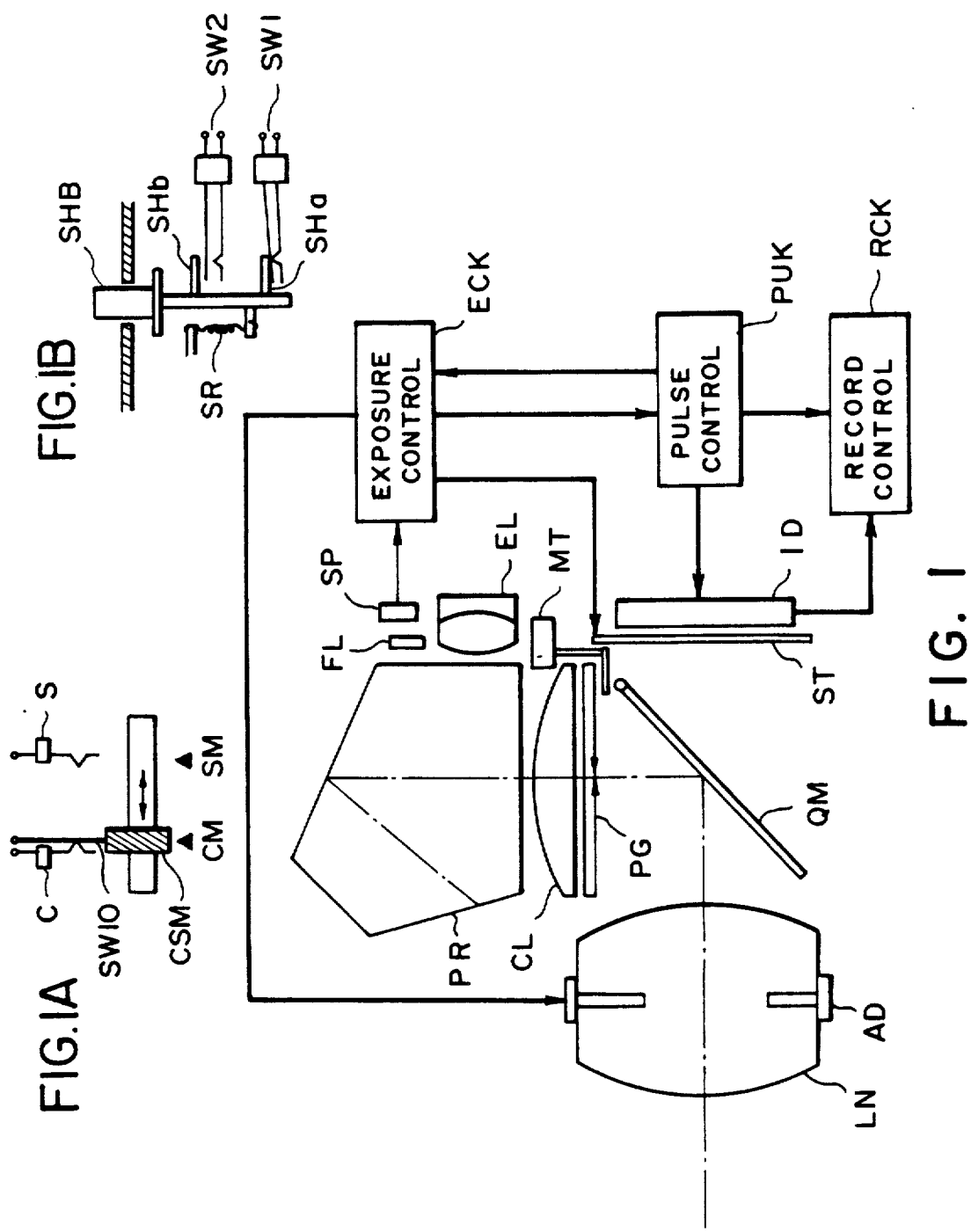

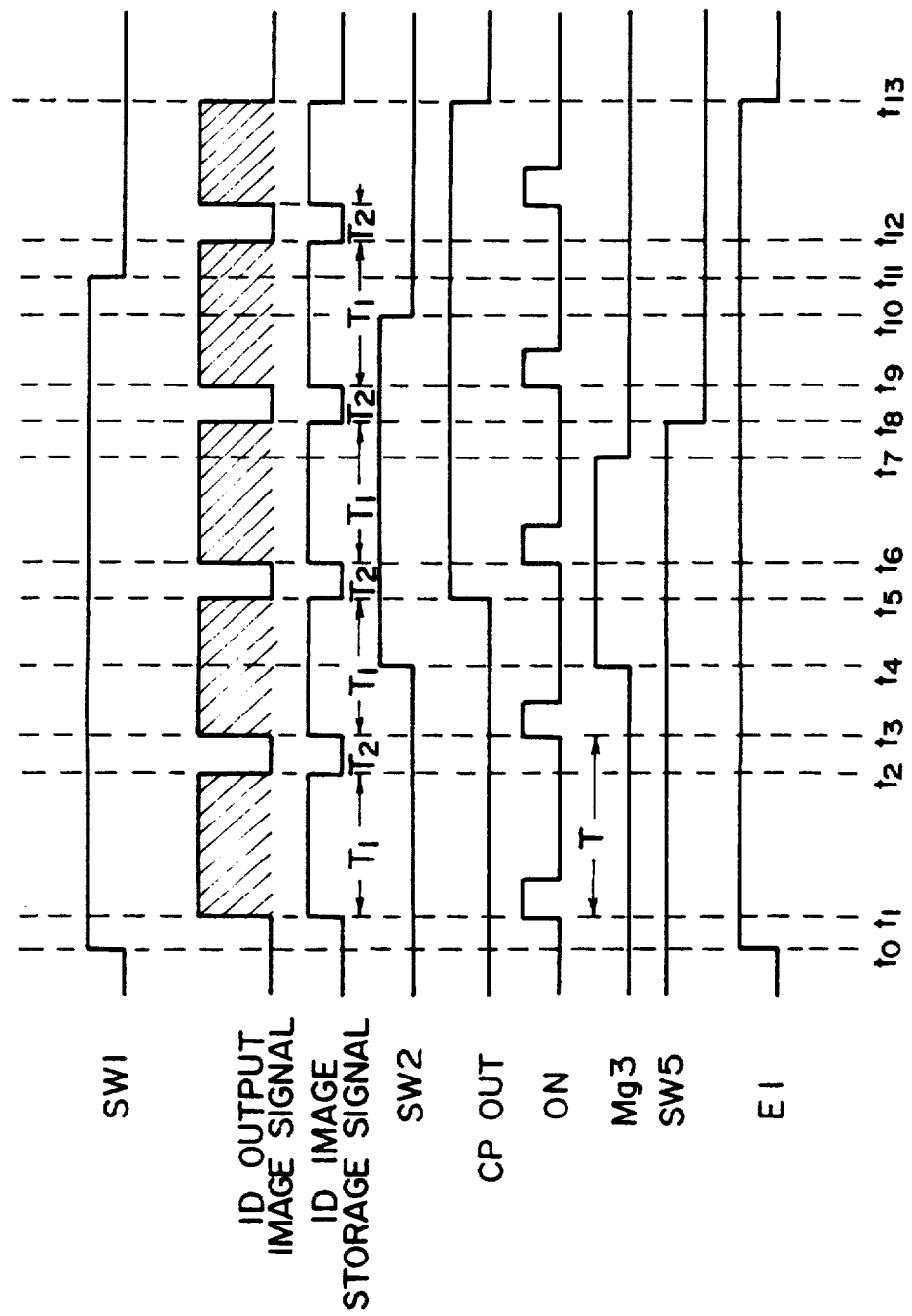

IMAGE SENSING ARRANGEMENT

This application is a continuation of application Ser. No. 033,885 filed on Apr. 2, 1987, which is a continuation of Ser. No. 885,816 filed on July 21, 1986, which is a continuation of Ser. No. 462,187 filed on Jan. 31, 1983, all of which are now abandoned.

BACKGROUND OF THE INVENTION

1. Field of the Invention

The present invention relates to an image sensing arrangement having a solid-state image sensing device for converting an image of an object to be photographed into an electrical signal and, more particularly, to an image sensing arrangement which has the single photography mode for photographing an object image only once and the continuous photography mode for continuously photographing the object image.

2. Description of the Prior Art

With recent advances in IC techniques, solid-state image sensing devices such as CCDs are used in video cameras or the like.

An electronic recording camera is known which uses a solid-state image sensing device of the type as described above on the imaging surface of an imaging lens. The object image is formed on the image sensing device which produces an image signal which is then recorded on a magnetic recording medium, thus taking a picture of the object.

A solid-state image sensing device of the type as described above allows control of the level of the image signal of the image formed thereon, that is, allows control of exposure. Therefore, the device is advantageous in that a picture may be taken without requiring a mechanical shutter as in the case of a conventional camera. However, with a solid-state image sensing device of the type described above, blooming of the stored image data may be caused under the condition of high luminance. Furthermore, in an electronic recording camera of the type described above, a magnetic recording means comprising a solid-state image sensing device or the like requires several seconds before it may be driven in the steady state; power must be supplied to the magnetic recording means before a picture is taken.

In this camera, the object image is formed on the solid-state image sensing device and the object image is stored as the image signal. In this manner, the object image is converted into the image signal by the solid-state image sensing device, and the image signal stored on the solid-state image sensing device is thereafter transferred to the magnetic recording medium. Accordingly, the storing operation of the image signal corresponds to the exposure time of a camera using a general photosensitive film; power must be supplied to the circuit until exposure is completed or the storing operation of the image signal is completed as in a general camera. In an electronic recording camera of the type described above, unlike a conventional camera, the photography cycle is not completed even if the exposure or image signal storage is completed. That is, after the image signal is stored, the image signal stored in the solid-state image sensing device must be transferred to the magnetic recording medium. Since the image signal is transferred serially, it takes a predetermined period of time before image signal transfer is completed.

A solid-state image sensing device consists of a plurality of picture elements which respectively store the image signals. Therefore, the image signals stored in the respective picture elements are serially read out to be recorded on the recording medium. Transfer of image signals thus requires a predetermined period of time. In an electronic recording camera, power must be supplied until the transfer operation is completed even after exposure is completed.

When a camera is of the diaphragm priority type, the storing time of the solid-state image sensing device must be controlled by an output from a photometer. A complex circuit is required to control the storing time, and the photographing interval changes for each picture in accordance with an output from the photometer. In the continuous photography mode, it is generally desired that the photographing interval be kept constant. The camera of the type described above fails to satisfy this requirement if it is of the diaphragm priority type.

In the continuous photography mode, the exposure time is preferably kept constant. If the exposure time is kept constant and if a picture is taken with an aperture diaphragm set for diaphragm priority in the single photography mode, optimal exposure may not be obtained; the aperture diaphragm must be manually adjusted in accordance with exposure time and luminance. If the user performs continuous photography with an aperture diaphragm set in the diaphragm priority mode, optimal exposure is not obtained.

SUMMARY OF THE INVENTION

The present invention has been made in consideration of this and has for its object to provide an image sensing arrangement which has both the single photography mode and the continuous photography mode and which gives optimal exposure in both these modes.

It is another object of the present invention to provide an image sensing arrangement which performs exposure control by driving a shutter means in the single photography mode and which does not allow operation of the shutter means in the continuous photography mode.

It is still another object of the present invention to provide an image sensing arrangement for an electronic recording camera using a solid-state image sensing device, which allows supply of power to a recording device until recording of image signals is completed even after a picture is taken.

It is still another object of the present invention to provide an electronic recording camera of the type in which an aperture of an aperture diaphragm is preset and the shutter speed is automatically set, which allows manual setting of the aperture diaphragm when the continuous photography mode is selected.

The above and other objects of the present invention will now become apparent from the following description of the preferred embodiments of the present invention which will be made with reference to the accompanying drawings.

BRIEF DESCRIPTION OF THE PREFERRED EMBODIMENTS

FIG. 1 is a block diagram showing the configuration of an electronic recording camera according to the first embodiment of the present invention;

FIGS. 1A and 1B illustrate the mode selecting switch construction and shutter button construction, respectively;

Figure 2A:
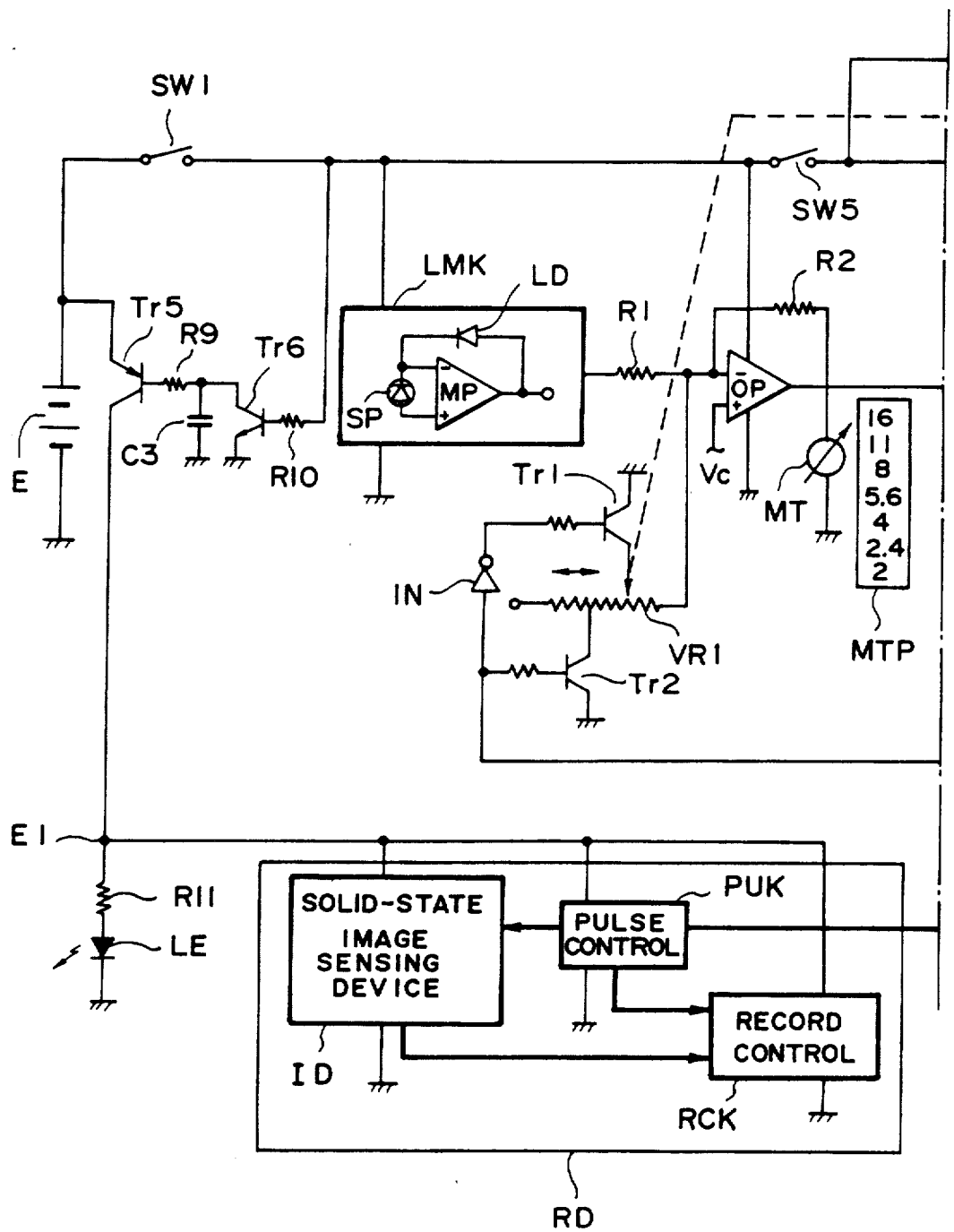
Figure 2B:
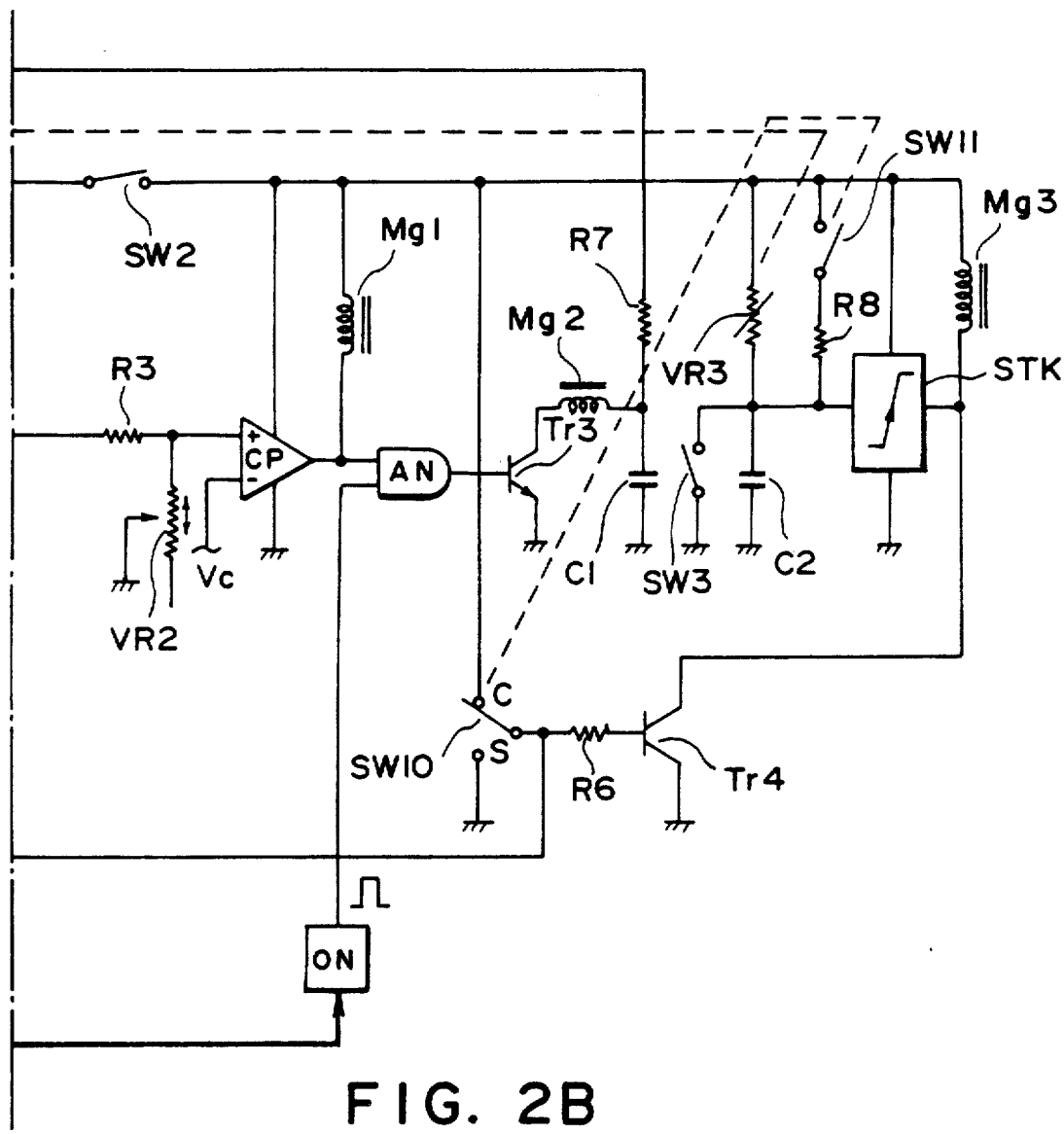
Figure 2:
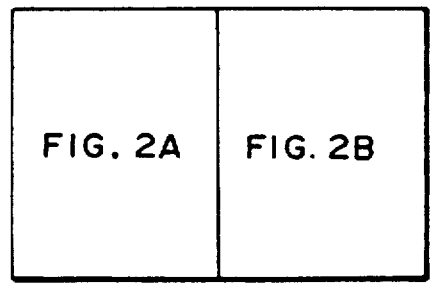
Figure 4A:
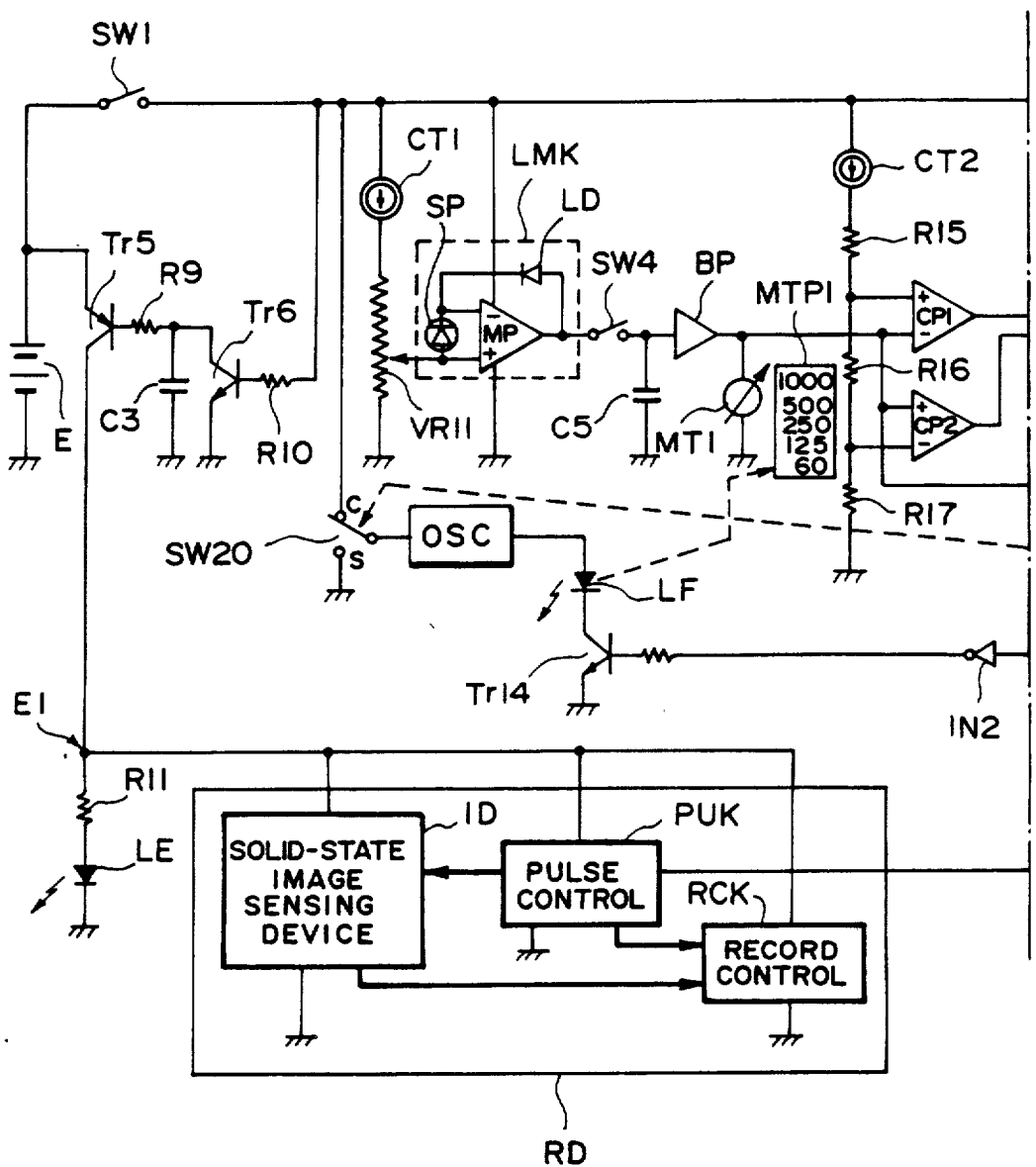
Figure 4B:
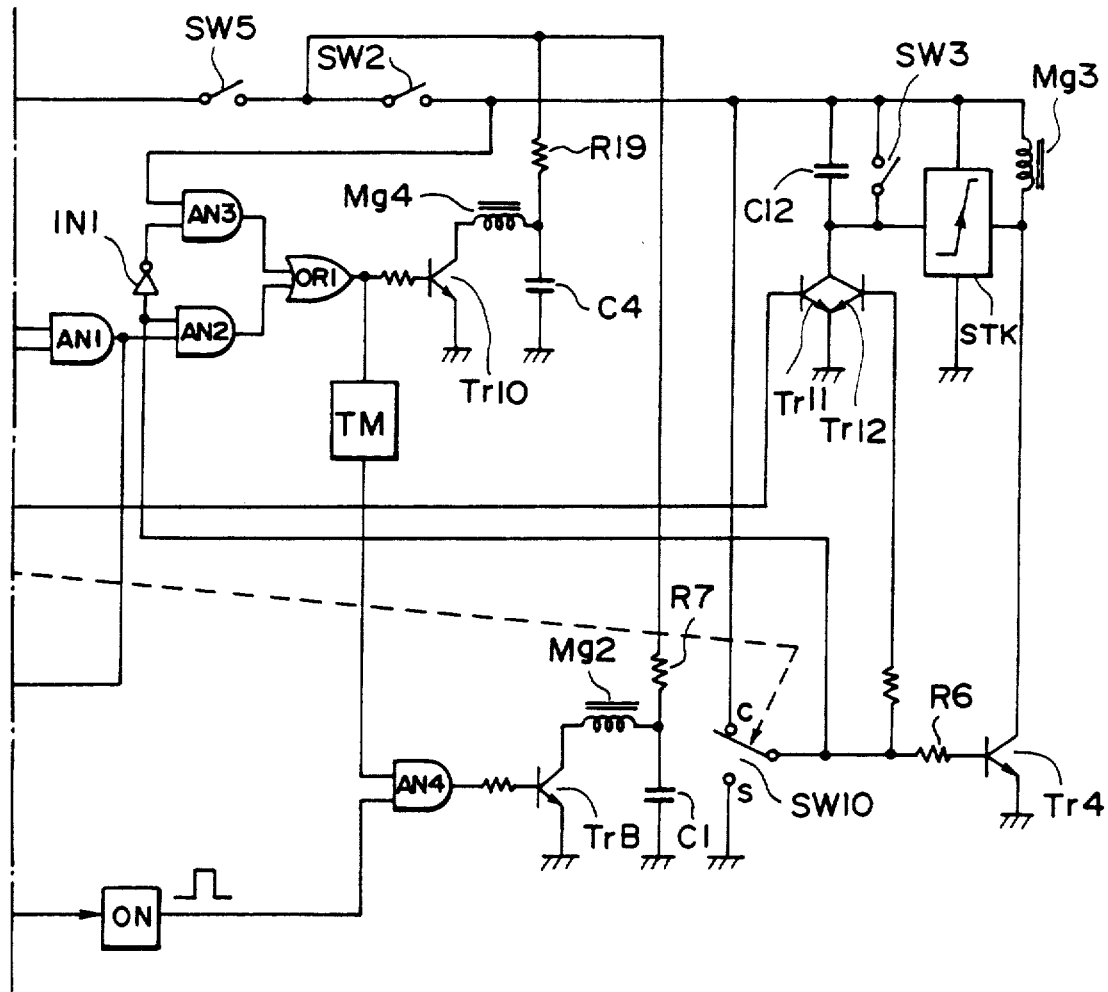
Figure 4:
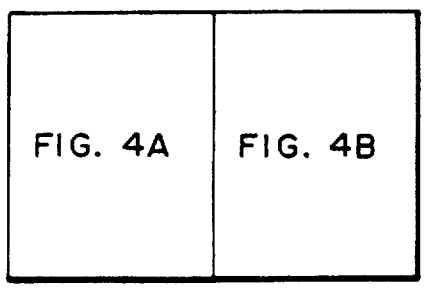
Figure 5:
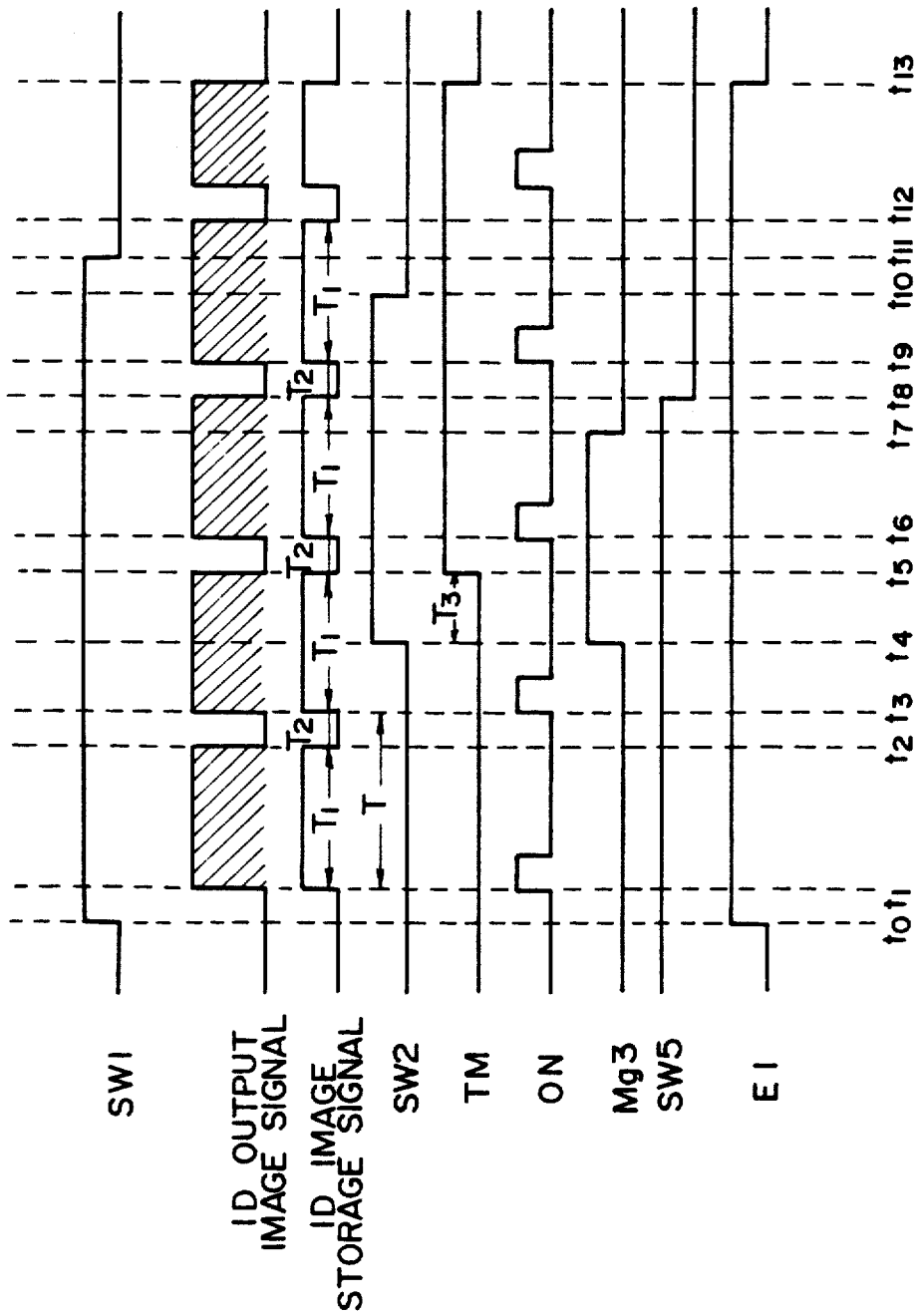

FIG. 2, consisting of 2A and 2B, is a circuit diagram of a control circuit of the electronic recording camera of the first embodiment shown in FIG. 1;

FIG. 3 is a timing chart for explaining the operation of the various components of the circuit shown in FIG. 2;

FIG. 4, consisting of 4A and 4B, is a circuit diagram of a control circuit of an electronic recording camera of the second embodiment of the present invention; and FIG. 5 is a timing chart for explaining the operation of various components of the circuit shown in FIG. 4.

DETAILED DESCRIPTION OF THE PREFERRED EMBODIMENTS

FIG. 1 shows a block diagram of an electronic recording camera according to the first embodiment of the present invention. The camera is of the same configuration as a general single reflex camera and has an imaging lens LN, an aperture diaphragm AD, a quick return mirror QM, a focal plane shutter ST, a focusing screen PG, a capacitor lens CL, a pentaprism PR, an eyepiece lens EL, a photometer focusing lens FL, a photometer photosensor SP, a meter MT for an exposure display device, and an exposure control ECK.

A solid-state image sensing device ID such as a CCD is disposed on the imaging surface behind the shutter ST. A record control RCK is for recording image signals stored on the solid-state image sensing device on a recording medium such as a magnetic recording medium. A pulse control PUK drives the solid-state image sensing device ID and the record control PCK, thus constituting a recording device RD.

FIG. 2 is a circuit diagram showing the detailed configuration of the circuit shown in FIG. 1. A photometer LMK logarithmically compresses a photocurrent flowing from the photosensor SP with a logarithmic compressor LD through a high-impedance operational amplifier MP. A data setting variable resistor VR1 changes its resistance to correspond to $SV-TV$ (where SV is sensitivity data and TV is shutter speed data) in accordance with the shutter speed setting dial and the image sensing device sensitivity data setting means. An operational amplifier OP calculates an output (data BV) from the photometer LMK and $SV-TV$ set by the variable resistor VR1, and produces aperture data $AV=BV+SV-TV$. The meter MT determines the position of its pointer in accordance with the output from the operational amplifier OP and displays an aperture at a display plate MTP.

The output from the operational amplifier OP is supplied to one input end of a comparator CP through a resistor R3. A variable resistor VR2 is also connected to the one input end of the comparator CP. A reference voltage Vc from a reference voltage source (not shown) is supplied to the other input end of the comparator CP. The variable resistor VR2 operates in synchronism with a diaphragm ring mechanism (not shown) and its resistance is variable in accordance with the aperture of the aperture diaphragm. When an aperture corresponding to the output from the operational amplifier OP is obtained, the output from the comparator CP goes high to disable a diaphragm control magnet Mg1 and to set the aperture of the aperture diaphragm.

In response to an image storing signal supplied to the solid-state image sensing device ID from the pulse control PUK, a one-shot circuit ON produces a one-shot pulse. The output end of the comparator CP is connected to one input end of an AND gate AN, while the output end of the one-shot circuit ON is connected to the other input end thereof. The output end of the AND gate AN is connected to the base of a transistor Tr3. The AND output from the AND circuit AN turns ON the transistor Tr3 for the duration of the one-shot pulse. When the transistor Tr3 is thus turned ON, a shutter front curtain run control magnet Mg2 is disposed on the discharge path from a capacitor C1. The magnet Mg2 is excited by the discharge current from the capacitor C1 so as to run the shutter front curtain.

A variable resistor VR3 has a resistance corresponding to the shutter speed which is set in synchronism with the shutter speed setting dial. A capacitor C2 and the variable resistor VR3 together constitute a time constant circuit for setting the shutter speed. A count switch SW3 operates in synchronism with the running operation of the shutter front curtain and is turned OFF after the shutter front curtain runs. When the count switch SW3 is turned OFF, the count operation of the shutter speed by the time constant circuit is started. A switching circuit STK such as a Schmitt-trigger circuit produces an output when the output from the time constant circuit reaches a predetermined level. The output from the switching circuit CTK deenergizes a shutter rear curtain holding magnet Mg3 to allow the rear curtain to run.

A switch SW10 is for switching between the continuous photography mode and the single photography mode. In synchronism with a mode selection means CSM as shown in FIG. 1, the switch SW10 is connected to the side of a constant C or S. The switch SW10 is connected to the base of a transistor Tr4 through a resistor R6. The collector of the transistor Tr4 is connected to the magnet Mg3. In the continuous photography mode, the transistor Tr4 keeps supplying power to the magnet Mg3 independently of the output from the shutter speed setting circuit (time constant circuit) so as to inhibit running of the shutter rear curtain and to keep the so-called bulb photography mode.

Transistors Tr1 and Tr2 and an inverter IN constitute a data switching circuit for switching the data to be set by the data setting variable resistor VR1. In the continuous photography mode, the transistor Tr2 is ON and the transistor Tr1 is OFF, so the variable resistor VR1 may have a resistance corresponding to a predetermined time data which, in turn, corresponds to the image signal storing time (e.g., 1/60 sec) of the solid-state image sensing device. In the single photography mode, the transistor Tr2 is OFF and the transistor Tr1 is ON, so the variable resistor VR1 has a resistance corresponding to $SV-TV$.

Transistors Tr5 and Tr6, a capacitor C3 and resistors R9 and R10 constitute a power supply circuit and a power supply timer circuit for supplying power or interrupting power supply to the recording device RD consisting of the record control PCK, the solid-state image sensing device ID and the pulse control PUK. The base of the transistor TR6 is connected to a first stroke switch SW1 through a resistor R10. The capacitor C3 is connected in the emitter-collector path of the transistor Tr6. When the first stroke switch SW1 is ON, the capacitor C3 is short-circuited. The base of the transistor Tr5 is connected to the capacitor C3 through a resistor R9, the emitter thereof is connected to a power supply E, and the collector thereof is connected to the solid-state image sensing device. The transistor Tr5 thus serves as a power transistor.

A resistor R11 and a light-emitting diode LE constitute a display circuit which is connected to the collector of the power transistor Tr5 and which displays the operation status of the recording device RD. A switch SW11 operates in synchronism with the switch SW10. When the switch SW10 is connected to the side of the contact C, the switch SW11 is ON to connect a resistor R8 having a low resistance to the capacitor C2, thus spontaneously disabling the time constant circuit and the switching circuit STK.

A safety switch SW5 is ON when the shutter winding is complete and is OFF when the shutter rear curtain runs; it operates in synchronism with the shutter rear curtain. The first and second stroke switches SW1 and SW2 operate in synchronism with a shutter release button SHB as shown in FIGS. 1B and 2. When the shutter release button SHB is depressed to the first stroke, the first stroke switch SW1 is turned ON by a pin SHa mounted on the shutter release button SHB. When the shutter release button SHB is depressed to the second stroke, the second stroke switch SW2 is turned ON by a pin SHb similarly mounted on the shutter release button SHB.

For each period T, the pulse control PUK supplies an image storing signal to the solid-state image sensing device. The solid-state image sensing device performs the image signal storing operation for a constant period T1. Then, the image signal stored in the period T1 is transferred to an analog shift register in the record control RCK through a known charge transfer means within a period T2 (where T=T1+T2). The image signal is then recorded on the recording medium in the next period T1.

The mode of operation of the electronic recording camera according to the first embodiment of the present invention will now be described.

Single Photography Mode

The case of the single photography mode will first be described. In this case, a mode selection means CSM is set to a mark SM. Then, the switch SW10 is connected to the side of the contact S, and the switch SW11 is turned OFF.

Subsequently, the shutter release button SHB is depressed to the first stroke at time t0 in FIG. 3. Then, the switch SW1 is turned ON by the pin SHa to enable the photometer LMK and the operational amplifier OP. Furthermore, when the switch SW1 is turned ON, the transistors Tr5 and Tr6 are also turned ON to supply a power supply voltage E1 to the recording device RD.

Since the photometer LMK and the operational amplifier OP are energized, the operational amplifier OP calculates on the basis of the output from the photometer LMK and the data set by the data setting variable resistor VR1. Since the switch SW10 is connected to the side of the contact S, the transistor TR2 is OFF while the transistor Tr1 is ON. Therefore, the variable resistor VR1 produces a signal (SV−TV) which corresponds to the shutter speed and the sensitivity data which are preset in the manner described above. Then, the operational amplifier OP calculates an aperture signal which is required to obtain optimal exposure and indicates the aperture by the meter MT.

Meanwhile, the power supply voltage E1 is supplied to the recording device RD, and the image storing signal is supplied to the solid-state image sensing device ID for each period T. In response to the image storing signal, the solid-state image sensing device stores the image signal for the period T1. Subsequently, the solid-state image sensing device ID transfers the image signal stored in the period T1 to the analog shift register in the device ID and is recorded on the recording medium in the next period T1. In the next period T1, a new image signal is stored by the solid-state image sensing device. In this manner, the record control RCK performs the image signal storing operation repeatedly by the solid-state image sensing device when the shutter release button SHB is depressed to the first stroke. When the shutter release button SHB is depressed to the second stroke, the image signal is actually recorded on the recording medium; image signal recording is not performed upon the first stroke operation of the shutter release button SHB.

When the shutter release button SHB is further depressed to the second stroke at time t4, the switch SW2 is turned ON and power is supplied to a comparator CP. At the same time, the magnet Mg1 is excited to start the diaphragm regulating operation. With the change in the actual aperture, the resistance of the variable resistor VR2 changes. When the resistance of the variable resistor VR2 reaches a value corresponding to the output from the operational amplifier OP, the comparator CP produces a signal of high level to disable the magnet Mg1. In other words, the aperture diaphragm is set to the aperture corresponding to the output from the operational amplifier OP or the aperture obtained in accordance with the initial preset shutter speed. Note that the quick return mirror QM is also operated at this time.

When the output from the comparator CP goes high at time t5, the output from the AND gate AN goes high in synchronism with start of image signal storing operation of the solid-state image sensing device. A current then flows to the magnet Mg2 to run the shutter front curtain and to start the exposure operation.

Since the one-shot circuit ON is triggered in synchronism with the image storing signal from the pulse control PUK, it produces a one-shot signal for each period T as shown in FIG. 3. Therefore, in response to the one-shot pulse (time t6) generated after time t5, the AND gate AN produces a signal of high level to turn ON the transistor Tr3. Then, the charge stored on the capacitor C1 is discharged to run the shutter front curtain and to start exposure.

When the exposure operation is started in this manner, the switch SW3 operating in synchronism with the shutter front curtain is turned OFF. The capacitor C2 is charged through the variable resistor VR3 in which the shutter speed data is prestored. After a time corresponding to the shutter speed elapses, the switching circuit STK is inverted to interrupt power supply to the magnet Mg1 so as to run the shutter rear curtain and to complete exposure.

At time T6, the image signal storing operation by the solid-state image sensing device ID is started and is continued for the period T1 (t6 to t8). Thus, an image is formed on the solid-state image sensing device ID for the time of the shutter speed (t6 to t7). The image signal storing level is determined by the shutter speed and the aperture.

The image signal stored in the image sensing portion of the solid-state image sensing device ID within the period T1 (t6 to t8) is transferred to the storing portion in the solid-state image sensing device ID in the period T2 (t8 to t9). The image signal is then recorded on the recording medium in the next image signal storing period T1 (t9 to t12).

When the depression of the shutter release button SHB is released, the switches SW1 and SW2 are both turned OFF. When the switch SW1 is turned OFF, the transistor Tr6 is turned OFF to release the short-circuited state of the capacitor C3. Then, a charge current flows to the capacitor C3 through the emitter-base path of the transistor Tr5 and the resistor R9. Thus, the transistor Tr5 is ON for a time period required for charging the capacitor C3 to a predetermined level. Power supply to the recording device RD continues even after the switch SW1 is turned OFF. Even after the depression of the shutter release button SHB is released after taking a picture, power supply to the recording device RD is continued until recording of the image signal on the recording medium is completed.

Since the image signal storing operation is performed within the period T1 (t6 to t8) and the image signal stored within the period T1 (t6 to t8) is recorded in the next image signal storing period T1 (t9 to t12), power supply to the recording device RD is not interrupted until the next image signal storing cycle is completed even after the image signal storing operation is completed.

Therefore, according to the first embodiment described above, even if the depression of the shutter release button SHB is released at time t11 and the switch SW1 is turned OFF, power supply to the capacitor C3 is continued for the charging period (at least a constant period required for the recording operation of the image signal) of the capacitor C3. At time t13 after time t12, the transistor Tr5 is turned OFF to interrupt power supply to the recording device RD, thus guaranteeing correct image recording.

CONTINUOUS PHOTOGRAPHY MODE

The continuous photography mode will now be described. In this case, the mode selection means CSM is set to a mark CM. Then, the switch SW10 is connected to the side of the contact C, and the switch SW11 is turned ON.

When the shutter release button SHB is depressed to the first stroke in this condition, power is supplied to the photometer LMK and to the recording device RD as in the case of the single photography mode. When the shutter release button SHB is further depressed to the second stroke thereafter, the aperture diaphragm regulating operation as described above is performed. In this case, since the switch SW10 is connected to the side of the contact C, the transistor Tr1 is turned OFF and the transistor Tr2 is turned ON. Then, the time data corresponding to the image signal storing time (T1 in FIG. 3) of the solid-state image sensing device is set in the variable resistor VR1. In this manner, the aperture is determined in accordance with the image signal storing time and the photometer output. After the aperture control for continuous photography is performed and the quick return mirror QM moves upward, the AND gate AN produces a signal of high level in synchronism with the image signal storing operation as in the case of the single photography mode. Then, the magnet Mg2 is excited to run the shutter front curtain and to start exposure.

When the exposure operation is started in this manner, the switch SW3 is turned OFF, and the shutter speed is counted. Since the switch SW11 is ON in this case, the switching circuit STK is spontaneously inverted. Since a signal of high level is applied to the base of the transistor Tr4 through the transistor SW10, the magnet Mg3 is excited independently of the inversion of the switching circuit STK. Therefore, the shutter rear curtain is kept held and the bulb photography mode is maintained.

For each period T, the solid-state image sensing device ID stores the image signal, and records the image signal thus stored on the recording medium. Therefore, photographing may be continuously performed within the period T. When the shutter release button SHB is released during the continuous photography mode, the switches SW1 and SW2 are turned OFF and power supply to the magnet Mg3 is interrupted to allow the shutter rear curtain to run. The exposure operation is thus completed. After a predetermined time elapses power supply to the recording device RD is interrupted and the continuous photography mode is terminated.

In the single photography mode, the recording device RD of this embodiment allows recording of the image signal on the recording medium and updating of the recording portion (recording track or the like) of the recording medium only once after a shutter rear curtain run signal or the like is generated upon depression of the shutter release button to the second stroke. In the continuous photography mode, each time the image signal storing operation is completed after the shutter release button SHB is depressed to the second stroke, the image signal is recorded on the recording medium, and the recording portion is updated.

A control circuit according to the second embodiment of the present invention will now be described with reference to FIG. 4. In the control circuit of the first embodiment, the shutter speed has the priority over the diaphragm in the single photography mode. However, in the control circuit of the second embodiment, the diaphragm has priority over the shutter speed in the single photography mode.

The camera main body of the second embodiment has the configuration as shown in FIG. 1. The same reference numerals as those in FIG. 1 denote the same parts as in FIG. 1, and a detailed description thereof is omitted.

A data setting variable resistor VR11 operates in synchronism with a diaphragm reset ring and an image sensing device sensitivity data setting means and has a resistance corresponding to sensitivity data SV and preset diaphragm data TV. The variable resistor VR11 is connected to a constant current supply CT1. One output end of the variable resistor VR11 is connected to the non-inverting input end of an operational amplifier MP of a photometer LMK. The photometer LMK sets the sensitivity data SV and the preset aperture data AV. A memory capacitor C5 is turned OFF in synchronism with the upward movement of a quick return mirror QM and receives the output from the photometer LMK through a memory switch SW4. A buffer amplifier BP is connected to an exposure display meter MT1. The meter MT1 changes the position of the pointer in accordance with the output from the photometer LMK and indicates the shutter speed at a display plate MTP1 which is arranged within a viewfinder.

The base of an elongating transistor Tr11 is connected to the output end of the buffer amplifier BP. A capacitor C12 constitutes a time constant circuit for the shutter speed counting and is charged by the collector current of the transistor Tr11. A count switch SW3 is turned OFF in synchronism with the running operation of the shutter front curtain. When the count switch SW3 is OFF, the capacitor C12 starts counting the shutter speed.

A switching circuit STK such as a Schmitt-trigger circuit as shown in FIG. 2 interrupts supply of power to a shutter rear curtain holding magnet Mg3 to allow the shutter rear curtain to run when the capacitor C12 is charged to a predetermined level.

A lock release magnet Mg4 releases the locked state of the shutter release lock member of a camera (not shown). The magnet Mg4 is arranged on the discharge path of the charge on a capacitor C4, which is formed by a transistor Tr10. The magnet Mg4 is excited by the discharge current of the capacitor C4 to release the lock member. AND gates AN2 and AN3, an OR gate OR1 and an inverter IN1 constitute a lock release signal generating circuit which serves to generate a lock release signal to turn ON the transistor Tr10 and to excite the magnet Mg4.

A delay line TM produces a signal of high level after a predetermined delay time in response to the lock release signal. The delay time obtainable with the delay line TM is determined such that the lock member is driven by the magnet Mg4, an aperture diaphgram AD of an imaging lens LN is controlled by an automatic diaphragm mechanism from the open state to the state set by the preset ring in synchronism with the lock member, and the quick return mirror QM may be moved upward within such time delay. A shutter front curtain run control magnet Mg2 is arranged on the discharge path of charge on a capacitor C1, which is formed by a transistor Tr13. The magnet Mg2 is excited by the discharge current to allow the shutter front curtain to run.

A one-shot circuit ON is similar to that shown in FIG. 2 and produces a one-shot pulse in response to an image storing signal from a pulse control PUK to a solid-state image sensing device ID. The output end of the delay line TM is connected to one input end of an AND gate AN4. The output end of the one-shot circuit ON is connected to the other input end of the AND gate AN4. The output end of the AND gate AN4 is connected to the base of the transistor Tr13. The transistor Tr13 is turned on for the duration of the one-shot pulse in response to an AND output from the AND gate AN4.

A switch SW10 allows selection between the single photography mode and the continuous photography mode, as in the case of FIG. 2. In synchronism with a mode selection means CSM, the switch SW10 is connected to the side of a contact C or S, as in the case of FIG. 1. The base of a transistor Tr4 is connected to the switch SW10 through a resistor R6 as in the case of FIG. 2. The collector of the transistor Tr4 is connected to the magnet Mg3. In the continuous photography mode, the transistor Tr4 continues to supply power to the magnet Mg3 independently of the output from the shutter speed counting circuit or the time constant circuit so as to inhibit running operation of the shutter rear curtain and to keep the bulb photography mode.

The emitter-collector path of a transistor Tr12 is connected in parallel with the transistor Tr11. The base of the transistor Tr12 is connected to the switch SW10. When the switch SW10 is connected to the side of the contact S, the transistor Tr12 is OFF. However, when the switch SW10 is connected to the side of the contact C, the transistor Tr12 spontaneously charges the capacitor C2 and spontaneously completes the counting operation with the shutter speed counting circuit.

A switch SW20 operates in synchronism with the switch SW10. When the switch SW10 is connected to the side of the contact C, the switch SW20 drives an oscillator OSC to flash a light-emitting diode IF to remind the user of the manual photography mode. The light-emitting diode LF indicates, by flashing, one of the shutter speeds attached on the display plate MTP1 which corresponds to the storing time (e.g., 1/60 sec) of the solid-state image sensing device. Thus, the user can see that the aperture diaphragm must be set to obtain a shutter speed of 1/60 sec.

A series circuit of resistors T15 to R17 is connected to a constant current supply CT2. Comparators CP1 and CP2 constitute window comparators. The comparators CP1 and CP2 produce signals of high level only when the output from the photometer LMK corresponds to the storing time (e.g., 1/60 sec) of the solid-state image sensing device ID.

The input ends of an AND gate AN1 are connected to the output ends of the comparators CP1 and CP2. The output end of the AND gate AN1 is connected to an input end of an AND gate AN2 of the lock release signal generating circuit and is also connected, through an inverter IN2, to the base of a transistor Tr14 connected in series with the light-emitting diode LF. When both the comparators CP1 and CP2 produce signals of high level in the continuous photography mode, the AND gate AN1 turns OFF the light-emitting diode LF to indicate that the shutter speed is set to the speed for continuous photography. Furthermore, the AND gate AN1 disables the lock release signal generating circuit to perform release lock until both the comparators CP1 and CP2 produce signals of high level. When the comparators CP1 and CP2 produce signals of high level, the AND gate AN1 enables the lock release signal generating circuit to release the lock.

Transistors Tr5 and Tr6, a capacitor C3 and resistors R9 and R10 constitute a power supply circuit and a power supply timer circuit for the recording device RD consisting of a record control RCK, the solid-state image sensing device ID and the pulse control PUK, as in the first embodiment.

A resistor R11 and a light-emitting diode LE constitute a display circuit which is connected to the collector of the power transistor Tr5 and displays the operating state of the recording device RD.

A safety switch SW5 is turned ON when the shutter winding is completed and is turned OFF when the shutter rear curtain runs; the safety switch SW5 operates in synchronism with the shutter rear curtain, as in the case of FIG. 2. First and second stroke switches SW1 and SW2 are also of the similar configuration as those of the first embodiment. When the shutter release button SHB is depressed to the first stroke, the switch SW1 is turned ON by a pin SHa mounted on the button SHB. When the shutter release button SHB is depressed to the second stroke, the switch SW2 is turned ON by a pin SHb similarly mounted on the button SHB.

For each period T, the pulse control PUK generates an image storing signal to the solid-state image sensing device. The solid-state image sensing device stores the image signal for the period T1, and transfers the image signal stored in the period T1 to an analog shift register in the solid-state image sensing device through a known charge transfer means within a period T2 (where $T = T1 + T2$). The transferred image signal is recorded on the recording medium in the next period T1.

The mode of operation of the electronic recording camera according to the second embodiment will now be described.

SINGLE PHOTOGRAPHY MODE

The case of the single photography mode will first be described. In this case, a mode selection means CSM is set to a mark SM. The switches SW10 and SW20 are connected to the side of contacts S. Subsequently, when the shutter release button SHB is depressed to the first stroke at time t0 in FIG. 5, the switch SW10 is turned ON by the pin SHa and the photometer LMK is energized. Since the switch SW1 is turned ON, the transistors Tr5 and Tr6 are turned ON and a power supply voltage E1 is supplied to the recording device RD.

When the photometer LMK is energized, the meter MT1 displays a shutter speed on the display plate in accordance with the output from the photometer LMK. The resistance of the variable resistor VR11 is set to correspond to the aperture data AV set by the diaphragm preset ring and the sensitivity data SV of the solid-state image sensing device. On the basis of the data AV and SV and luminance data BV from a photosensor SP, the output from the photometer LMK indicates shutter speed data TV necessary for obtaining optimal exposure ($BV+SV-AV=TV$). The output from the automatic diaphragm mechanism is supplied to the meter MT1 through the switch SW4, the capacitor C5 and the buffer amplifier BP. The meter MT1 indicates a shutter speed on the display plate MTP1 in accordance with the shutter speed data.

The power supply voltage E1 is supplied to the recording device RD. The image storing signal is supplied to the solid-state image sensing device ID for each period T. In response to the signal, the image sensing portion of the solid-state image sensing device ID stores the image signal for the period T1, and transfers the stored image signal to the storing portion of the solid-state image sensing device for a period T2. In the next period T1, the transferred image signal is recorded on the recording medium. In the period T1 for recording the image signal, a new image signal is stored in the image sensing portion of the solid-state image sensing device. In this manner, when the shutter release button SHB is depressed to the first stroke, the recording device RD repeatedly performs the image signal recording operation. However, each time the shutter release button SHB is depressed to the second stroke, the record control RCK performs the image signal recording operation on the recording medium. Image signal recording is not performed when the shutter release button is depressed to the first stroke.

When the shutter release button SHB is further depressed to the second stroke at time t4, the switch SW2 is turned ON. A signal of high level is supplied to the one input end of the AND gate AN3 through the switch SW2. Since the switch SW10 is connected to the side of the contact S in the single photography mode, a signal of high level is also supplied to the other input end of the AND gate AN4 through an inverter IN1. Thus, the AND gate AN3 produces a signal of high level when the shutter release button SHB is depressed to the second stroke. The signal of high level from the AND gate AN3 is supplied to the base of the transistor Tr10 through the OR gate OR1 to turn ON the transistor Tr10. Then, the charge on the capacitor C4 is discharged to the magnet Mg4 through the switches SW1 and SW5 and a resistor R19. The magnet Mg4 is thus excited to drive a lock member (not shown). The automatic diaphragm starts operating to control the aperture to a value set by the diaphragm preset ring. The quick return mirror QM is moved upward. The memory switch SW4 is turned OFF, and the shutter speed is stored in the memory capacitor C5.

The lock member is driven by the signal of high level from the OR gate OR1. The delay line TM is also triggered by the signal of high level to perform delay operation. After a delay time T3 of the delay line TM, a signal of high level from the delay line TM is supplied to the one input end of the AND gate AN4 at time t5. Since the other input end of the AND gate AN4 is connected to the output end of the one-shot circuit ON, the AND gate AN4 produces a signal of high level in synchronism with the image signal storing operation of the solid-state image sensing device ID after the delay time. Then, the shutter front curtain is driven to start the exposure operation.

Since the one-shot circuit ON is triggered by the image storing signal from the pulse control PUK, it produces a one-shot pulse for each period T as shown in FIG. 5. In response to the one-shot pulse (time t6) generated after time t5, the AND gate AN4 produces a signal of high level to turn on the transistor Tr13 and to discharge the charge on the capacitor C1 to the magnet Mg2. The shutter front curtain then runs and the exposure operation is started.

After the shutter release button SHB is depressed to the second stroke, the AND gate AN4 produces a signal of high level in synchronism with the image storing signal after the delay time, thus starting the exposure operation. Since the delay time corresponds to the diaphragm control time by the automatic diaphragm mechanism and the mirror movement time, exposure is performed after the diaphragm control and mirror movement are completed and in synchronism with the image signal storing operation of the solid-state image sensing device.

When exposure is started in this manner, the switch SW3 operating in synchronism with the shutter front curtain is turned OFF and a current corresponding to the shutter speed elongated by the transistor Tr11 is charged on the capacitor C2. Since a voltage corresponding to the shutter speed data TV stored on the memory capacitor C5 is applied to the base of the transistor Tr11 through the buffer amplifier BP, the data TV is elongated by the transistor Tr11. The capacitor C12 is charged with a current corresponding to the elongated data TV. When the capacitor C12 is charged and time corresponding to the data TV elapses, and the charge on the capacitor C12 reaches a predetermined value at time t7, the switching circuit STK is inverted to interrupt power supply to the magnet Mg3 to allow the shutter rear curtain to run and to complete exposure.

At time t6, the image signal storing operation by the solid-state image sensing device ID is started in synchronism with the exposure start. The image signal storing operation is performed for the period T1 (t6 to t8). Therefore, an image is formed on the image sensing device for a time period of the shutter speed (t6 to t7), and the image signal storing level is controlled by the shutter speed and the aperture.

The image signal stored on the image sensing portion of the solid-state image sensing portion in the period T1 (t6 to t8) is transferred to the storing portion of the device within the period T2 and is then recorded on the recording medium in the next period T1 (t9 to t12).

As in the case of the first embodiment, when the depression of the shutter release button SHB is released, both the switches SW1 and SW2 are turned OFF. When the switch SW1 is turned OFF, the transistor Tr6 is turned OFF, and the short-circuited state of the capacitor C3 is released. Then, a charge current flows to the capacitor C3 through the resistor R9 and the emitter-base path of the transistor Tr5. The transistor Tr5 is turned ON for the time period required for charging the capacitor C3 to a predetermined level. Power supply to the recording device RD is continued for a predetermined time even after the switch SW1 is turned ON. When the depression of the shutter release button SHB is released after taking a picture, power supply to the recording device RD is continued until the image signal is completely recorded on the recording medium.

Continuous Photography Mode

The continuous photography mode will now be described. In this case, the mode selection means CSM is set to a mark CM. Then, the switches SW10 and SW20 are connected to the side of contacts C.

When the shutter release button SHB is depressed to the first stroke in this state, power is supplied to the photometer LMK and to the recording device RD as in the case of the single photography mode. Power is also supplied to the oscillator OSC through the switch SW20 to energize the oscillator OSC. If the output from the photometer LMK has not reached the storing period T1 (e.g. 1/60 sec), the window comparators CP1 and CP2 do not produce signals of high level, and the AND gate AN1 produces a signal of low level. The signal of high level is supplied to the base of the transistor Tr14 to turn ON the transistor Tr14. Thus, the light-emitting diode LF flashes by the pulse from the oscillator OSC. The display plate MTP1 displays the shutter speed 1/60 sec to remind the operator that the diaphragm must be set to obtain the shutter speed of 1/60 sec for continuous photography. When the shutter release button SHB is depressed to the second stroke in this state, the switch SW2 is turned ON, and a signal of high level is supplied to the one input end of the AND gate AN3. Since a signal of low level is supplied to the other input end of the AND gate AN3 through the inverter IN1, the contact C of the switch SW10, and the switch 2, the AND gate AN3 does not produce a signal of high level and the magnet Mg4 is not excited. The shutter release button is thus locked.

Since the manual setting of the aperture is indicated by the light-emitting diode LF in this manner, the user sets a predetermined aperture by the diaphragm preset ring. Then, the resistance of the variable resistor VR11 changes to vary the output from the photometer LMK. When the output from the photometer LMK reaches a value corresponding to the storing period T1 (e.g., 1/60 sec) during the setting of the aperture by the diaphragm preset ring, both the window comparators CP1 and CP2 produce signals of high level and the AND gate AN1 produces a signal of high level. The signal of high level from the AND gate AN1 is supplied to the base of the transistor Tr14 through the inverter IN2, the transistor Tr13 is turned OFF, and the light-emitting diode LF goes OFF, indicating that the shutter speed is set for continuous photography.

When the shutter release button SHB is depressed to the second stroke in this state, the switch SW2 is turned ON, and a signal of high level is supplied to the one input end of the AND gate AN2 through the switch SW2 and the contacts C of the switch SW10. Since the signal of high level from the AND gate AN1 is supplied to the other input end of the AND gate AN2, when the shutter release button SHB is depressed to the second stroke after manual setting of the shutter speed, the AND gate AN2 produces a signal of high level. The signal of high level from the AND gate AN2 is supplied to the base of the transistor Tr10 through the OR gate OR1 to turn ON the transistor Tr10 and to excite the magnet Mg4. Then, the lock member is driven. The aperture is set to the preset aperture data, the quick return mirror is moved up, and the shutter front curtain runs in synchronism with the start of the image signal storing operation, as in the case of the single photography mode. Thus, exposure is started.

When exposure is started in this manner, the switch SW3 is turned OFF, and the shutter speed counting is started. Since the switch SW10 is connected to the side of the contact C, and the transistor Tr12 is ON, the switching circuit STK spontaneously inverts. Since a signal of high level is supplied to the base of the transistor Tr4 through the switch SW10, the transistor Tr4 is ON and the magnet Mg3 is excited independently of the inversion of the switching circuit STK. In this case, the shutter rear curtain is kept held, and the bulb photography mode is maintained.

The solid-state image sensing device ID stores the image signals for the period T1 for each period T, and records the image signal thus stored on the recording medium. Thus, continuous photography is performed for the period T. When the depression of the shutter release button SHB is released during continuous photography, the switches SW1 and SW2 are turned OFF, the magnet Mg3 is deenergized, and the shutter rear curtain runs. The exposure is thus terminated, and power supply to the recording device RD is interrupted, thus completing continuous photography.

As in the case of the first embodiment, according to the second embodiment of the present invention, the recording device RD performs recording of the image signal only in response to the shutter rear curtain run signal after the shutter release button is depressed to the second stroke in the single photography mode. The recording portion (recording track or the like) of the recording medium is also updated. In the continuous photography mode, each time storing operation of the image signal is completed, the image signal is recorded on the recording medium, and the recording portion is updated. In the above embodiments, a focal plane shutter which has a shutter front curtain and a shutter rear curtain is used. However, other shutter means such as a lens shutter serving also as a diaphragm may also be used. Furthermore, although single-reflex cameras are used in the above embodiments, the viewfinder system and the lens system may be separate from each other.

In the above embodiments, supply of power to the recording device is assured by a timer circuit which holds power for a predetermined period of time necessary for image signal recording after the first stroke switch SW1 is turned OFF. However, the power supply time held by the timer circuit may be set to a long period longer than several seconds. Then, when a picture is taken once in several seconds in the single photography mode, wait time for bringing the recording device to the steady state need not be considered, allowing instantaneous photography.

Furthermore, it is also possible to supply power to the recording device RD by the power transistor responsive to the first stroke switch SW1 and to actuate the timer circuit by the OFF state of the second stroke switch SW2, so that the power transistor is turned OFF after a predetermined period of time set by the timer circuit to interrupt power supply to the recording device for such a period of time. In this case, power supply to the exposure control circuit such as the shutter speed control circuit must be kept for the predetermined period of time set by the timer circuit, and the predetermined period of time set by the timer circuit must be about twice the transfer time of the image signal.

In the electronic recording camera according to the present invention, the exposure time of the solid-state image sensing device is regulated by the shutter means in the single photography mode. In the continuous photography mode, the shutter means is kept in the bulb photography mode to allow continuous photography. Therefore, blooming as in conventional cameras may be prevented, and a charging operation of the shutter means is not required in the continuous photography mode. Continuous photography may be performed without requiring a shutter charge means such as a power winder, so that photography intervals may be reduced and power consumption for shutter charge is eliminated.

As in the first embodiment, in the single photography mode, the shutter means is driven in accordance with the preset shutter speed, and the aperture is automatically determined in accordance with the output from the photometer and the shutter speed. Thus, the shutter speed has priority over the diaphragm. In the second embodiment, in the single photography mode, the shutter speed is automatically determined by the preset aperture and the output from the photometer. Thus, the diaphragm has priority over the shutter speed. In this manner, the present invention can provide an electronic recording camera which may operate in accordance with shutter speed priority or diaphragm priority. An electronic recording camera capable of operating in both these modes may be obtained by incorporating the circuits shown in FIGS. 2 and 4 in a single camera.

In the electronic recording camera of the present invention, a timer circuit is provided which operates when the lock member is released in response to the switch associated with the release operation. Power supply to the recording device is held for the time period held by the timer circuit. Therefore, even if the lock member is released before the recording operation of the image signal is completed, power may be supplied to the recording device until image signal recording is completed. Thus, image signals may be correctly recorded.

The present invention is not limited to the particular embodiments described above, and various other changes and modifications may be made within the spirit and scope of the present invention.

What is claimed is:
1. An image sensing arrangement comprising:
 (a) solid-state image sensing device for converting an image of an object into a corresponding electrical signal;
 (b) a shutter means for controlling an exposure time of said image sensing device;
 (c) release switch means for operating said shutter means;
 (d) an aperture member for controlling an aperture to regulate light incident on said solid-state image sensing device;
 (e) selecting means for selecting between a single image pick-up mode for picking up a single image of the object and a continuous image pick-up mode for continuously picking up the image of the object; and
 (f) controlling means for controlling said shutter means to open from a closed state in response to said release switch means for a predetermined exposure time for a single image and controlling said aperture member according to said predetermined exposure time and a luminance of the object when the single image pick-up mode is selected, and for maintaining said shutter means open during imaging and reading out the electrical signal a plurality of times from said solid-state image sensing device and controlling said aperture member according to a storing time of said electrical signal in said solid-state image sensing device and the luminance of the object when the continuous image pick-up mode is selected.

2. An arrangement according to claim 1, further comprising photometer means for measuring a luminance of the object.

3. An arrangement according to claim 2, further comprising shutter speed initial presetting means for presetting the exposure time of said image sensing device controlled by said shutter means; and diaphragm means for controlling an exposure value of said image sensing device.

4. An arrangement according to claim 3, wherein said controlling means calculates an aperture of said diaphragm means in accordance with a shutter speed preset by said presetting means and an output from said photometer means when the single image pick-up mode is selected by said selecting means.

5. An arrangement according to claim 4, further comprising displaying means for displaying a calculated aperture.

6. An arrangement according to claim 4, further comprising automatic setting means for setting said diaphragm means to a calculated aperture.

7. An arrangement according to claim 2, further comprising diaphragm means for controlling an exposure value of said image sensing device, and said controlling means calculates an aperture of said diaphragm means in accordance with a storing time of said image sensing, device and an output from said photometer means when the continuous image pick-up mode is selected by said selecting means.

8. An arrangement according to claim 7, further comprising displaying means for displaying a calculated aperture.

9. An arrangement according to claim 7, further comprising automatic setting means for automatically setting said diaphragm means to a calculated aperture.

10. An arrangement according to claim 2, further comprising diaphragm means for controlling an exposure value of said image sensing device, and diaphragm initial presetting means for presetting an aperture of said diaphragm means.

11. An arrangement according to claim 10, wherein said controlling means calculates a shutter speed of said shutter means in accordance with a preset value of said presetting means and an output from said photometer means when the image pick-up mode is selected by said selecting means.

12. An arrangement according to claim 11, further comprising automatic controlling means for driving said shutter means at a calculated shutter speed.

13. An arrangement according to claim 11, further comprising displaying means for displaying a calculated shutter speed.

14. An arrangement according to claim 10, further comprising warning means for warning an operator to remind the operator of the manual setting of the aperture of said diaphragm means when the continuous image pick-up mode is selected by said selecting means.

15. An arrangement according to claim 14, further comprising signalling means for signalling that the aperture of said diaphragm means is within a range determined by a storing time of said image sensing device and an output from said photometer means, when the continuous image pick-up mode is selected by said selecting means.

16. An arrangement according to claim 15, wherein said warning means and said signalling means comprise a single member.

17. An arrangement according to claim 14, wherein said controlling means prohibits exposure of the image of the object on said image sensing device until the aperture of said diaphragm means is within a range determined by a storing time of said image device and an output from said photometer means, when the continuous photography mode is selected by said selecting means.

18. An arrangement according to claim 1, wherein said shutter means comprises a focal plane shutter having a shutter front curtain and a shutter rear curtain.

19. An arrangement according to claim 1, further comprising an imaging optical system for forming the image of the object on said image sensing device, and a viewfinder for allowing observation of the image of the object through said imaging optical system.

20. An image sensing arrangement according to claim 1, wherein said shutter means comprises a front curtain and a rear curtain.

21. An image sensing arrangement according to claim 1, wherein said shutter means is normally closed.

22. An image sensing arrangement according to claim 1, further comprising a trigger member for initiating an image pickup operation.

23. An image sensing arrangement according to claim 22 wherein said controlling means changes a state of said shutter means from a closed state to an open state in response to a trigger signal from said trigger means.

24. An image sensing arrangement according to claim 23 wherein in the single image pick-up mode, said shutter means is closed after the predetermined imaging time passes and when the state of said shutter means is charged from the closed state to the open state an electrical signal is read out from said image sensing device.

25. An image sensing apparatus according to claim 23, wherein in the continuous image pick-up mode, after said shutter means is changed from the closed state to the open state, the electrical signal is read out from said image sensing device a plurality of times while maintaining the open state of said shutter means.

26. An image sensing arrangement comprising:
(a) image sensing means for forming an image signal from an image of an object and for storing said image signal;
(b) exposure means for controlling light incident on said image sensing means; and
(c) an aperture member for controlling an aperture of light incident on said image sensing means;
(d) control means for causing said exposure means to expose said image sensing means to the incident light from a closed state for a predetermined exposure time to form a predetermined image signal and controlling said aperture member according to said predetermined exposure time and a luminance of the object by said exposure means when a single image is picked up by said image sensing means, and for causing said exposure means to continuously expose said image sensing means to said incident light and controlling said aperture member according to a storing time of said image sensing means and the luminance of the object by said exposure means while plural images are continuously picked-up and intermittently read out by said image sensing means.

27. An image sensing arrangement according to claim 26, wherein said exposure means comprises shutter means.

28. An image sensing arrangement according to claim 27, wherein said shutter means comprises a front curtain and a rear curtain.

29. An image sensing arrangement according to claim 26, further comprising trigger member for initiating an image pick-up operation.

30. An image sensing arrangement according to claim 29, wherein said controlling means changes a state of said shutter means from a closing state to an opening state in response to a trigger signal from said trigger means.

31. An image sensing arrangement according to claim 30, wherein in the single image pick-up made, said shutter means is closed after the predetermined imaging time passes, and when the state of said shutter means is changed from the closed state to the open state the image signal is read out from said image sensing means.

32. An image sensing arrangement according to claim 30, wherein in the continuous image pick-up after said shutter means is changed from the closed state to the open state, the image signal is read out from said image sensing means a plurality of times while maintaining the open state of said shutter means.

33. An image sensing arrangement according to claim 26, further comprising photometer means for measuring a luminance of the object.

34. An image pick-up arrangement comprising:
(a) a image sensing means for converting a light image projected onto said sensing means into an electrical signal;
(b) means for generating an image storage signal to control said sensing means, the image storage signal comprising a sequence of cycles each of which consists of an image storage interval and an image transfer interval;
(c) an aperture member for controlling an aperture of light incident on said image sensing means;
(d) shutter means for screening the light image projected onto said sensing means;
(e) means for selecting one of a single image pick-up mode or a continuous image pick-up mode; and
(f) control means responsive to the start of an image pick-up operation for opening said shutter from a closed state by a predetermined exposure time during a single image storage interval of said image storage signal when the single image pick-up mode is selected and controlling said aperture member according to said predetermined exposure time and a luminance of an object, and alternatively for opening said shutter until the termination of the image pick-up operation so that the exposure time for each image pick-up is determined by the image storage interval when the continuous image pick-up mode is selected.

35. An image pick-up arrangement according to claim 34, wherein said predetermined exposure time in the single image pick-up mode is determined as a function of a preselected aperture and the aperture in the continuous image pick-up mode is determined as a function of the image storage interval.

36. An image sensing arrangement according to claim 34 further comprising photometer means for measuring a luminance of the object.

37. An image sensing arrangement having a single image pick-up mode and a continuous image pick-up mode comprising:
 (a) image sensing means for forming an electrical image signal from an image of an object;
 (b) shutter means for exposing said image sensing means for a predetermined exposure time to control a storage time of said image sensing device when the single image pick-up mode is selected;
 (c) control means for maintaining said shutter means open and driving said image sensing means to control a storage time of said image sensing means when plural images are intermittently picked-up by said image sensing means; and
 (d) iris control means for controlling an aperture to said image sensing means according to said predetermined exposure time and a luminance of the object in the single image pick-up mode, and for controlling the aperture to said image sensing means according to said storage time and the luminance of the object in the continuous image pick-up mode.

38. An image sensing arrangement according to claim 37, wherein said shutter means has a front curtain and a rear curtain.

39. An image sensing arrangement according to claim 37, wherein said shutter means is normally closed.

40. An image sensing arrangement according to claim 37, further comprising trigger member for starting image pick-up.

41. An image sensing arrangement according to claim 40, wherein said control means change a state of said shutter means from a closing state to an opening state in response to a trigger from said trigger member.

42. An image sensing arrangement according to claim 41, wherein in the single image pick-up mode, said shutter means is closed after the predetermined imaging time passes, and when the state of said shutter means is changed from the closed state to the open state the electrical image signal is read out from said image sensing means.

43. An image sensing arrangement according to claim 41, wherein in the continuous image pick-up mode, after said shutter means is changed from the closed state to the open state, the electrical image signal is read out from said image sensing means a plurality of times while maintaining the open state of said shutter means.

44. An image sensing arrangement according to claim 37, further comprising photometer means for measuring a luminance of the object.

* * * * *

UNITED STATES PATENT AND TRADEMARK OFFICE
CERTIFICATE OF CORRECTION

PATENT NO. : 4,992,883

DATED : February 12, 1991

INVENTOR(S) : Tokuichi Tsunekawa

It is certified that error appears in the above-identified patent and that said Letters Patent is hereby corrected as shown below:

COLUMN 5:

Line 22, "ON" should read --ON--.

COLUMN 10:

Line 4, "diode IF" should read --diode LF--;
   Line 12, "resistors T15 to R17" should read --resistors R15 to R17--; and
   Line 58, "ON" should read --ON--.

COLUMN 11:

Line 12, "ON" should read --ON--; and
   Line 17, "display plate" should read --display plate MTP1--.

COLUMN 13:

Line 46, "switch 2," should read --switch SW2,--.

UNITED STATES PATENT AND TRADEMARK OFFICE
CERTIFICATE OF CORRECTION

PATENT NO. : 4,992,883

DATED : February 12, 1991

INVENTOR(S) : Tokuichi Tsunekawa

It is certified that error appears in the above-identified patent and that said Letters Patent is hereby corrected as shown below:

COLUMN 15:

Line 62, "solid-state" should read --a solid-state--.

COLUMN 16:

Line 50, "sensing," should read --sensing--.

COLUMN 17:

Line 1, "the image" should read --the single image--;
Line 28, "image device" should read --image sensing device--;
Line 30, "photography" should read --image pick-up--;
Line 48, "pickup" should read --pick-up--;
Line 57, "charged" should read --changed--;
Line 59, "apparatus" should read --arrangement--;

UNITED STATES PATENT AND TRADEMARK OFFICE
CERTIFICATE OF CORRECTION

PATENT NO. : 4,992,883
DATED : February 12, 1991
INVENTOR(S) : Tokuichi Tsunekawa It is certified that error appears in the above-identified patent and that said Letters Patent is hereby corrected as shown below:

COLUMN 18:

Line 36, "made" should read --mode,--;
    Line 42, "continuous image pick-up" should read --continuous image pick-up mode,--;
    Line 51, "a image" should read --an image--.

COLUMN 20:

Line 15, "change" should read --changes--; and
    Line 17, "trigger from" should read --trigger signal from--.

Signed and Sealed this

Twenty-fifth Day of July, 2000

Q. TODD DICKINSON

*Attest:*

*Attesting Officer*      *Director of Patents and Trademarks*